United States Patent Office 2,704,756
Patented Mar. 22, 1955

2,704,756

ORGANIC DERIVATIVES OF TETRAVALENT TIN AND COMPOSITIONS CONTAINING THE SAME

William E. Leistner, Brooklyn, and Arthur C. Hecker, Richmond Hill, N. Y., assignors to Argus Chemical Laboratory, Inc., a corporation of New York No Drawing. Application May 14, 1952,
Serial No. 287,806

13 Claims. (Cl. 260—242)

The present invention relates to novel organic derivatives of tetravalent tin and to compositions containing the same. This is a continuation-in-part of Serial No. 270,531, filed February 7, 1952, now Patent No. 2,641,596.

The derivatives according to our invention are derived from tetravalent tin by having at least one valence and at the utmost, three valences linked to the sulfur atom of a mercapto acid amide, while the remaining valence or valences are bound to an alkyl, aryl, oxyalkyl and oxyaryl, and the furfuryl and tetrahydrofurfuryl radical.

The compounds are represented by the type formula

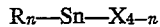

wherein R stands for a radical selected from the group consisting of alkyl, aryl, hydroaromatic or heterocyclic radicals, X for the radical of an amide of a mercapto acid having from 2 to 6 carbon atoms, and $n$ for an integral number from 1 to 3.

Examples for R are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_8H_{17}O$, $C_6H_5O$, $C_6H_4(CH_3)O$; $C_6H_3(CH_3)_2O$; and the furfuryl and tetrahydrofurfuryl groups.

Examples for X are the radicals of amides or substituted amides of thioglycolic acid, of thiopropinonic, thiobutyric, thiovalerianic or thiocaproic acids. Taking as specific amides, for instance, the thin thioglycolic acid amyl amides, the product may have the following formulae:

(1) $C_4H_9.Sn—(S.CH_2.CONH.C_5H_{11})_3$
(2) $(C_4H_9)_2Sn—(S.CH_2.CONH.C_5H_{11})_2$
(3) $(C_4H_9)_3Sn—(S.CH_2.CONH.C_5H_{11})$

The novel tin compounds according to our invention are oily liquids of high viscosity, whose composition has in each case been ascertained by analysis.

They are soluble in many organic solvents, for instance in ether, benzene, toluene, chloroform, carbontetrachloride, etc.

A general method to prepare these compounds is first to prepare the desired amide of the mercapto acid chosen, and subsequently to react the amide with an organic tin halide, organic tin oxide, or a stannonic acid, containing an organic radical.

The invention will now be illustrated by a number of examples, but it should be understood that these are given by way of illustration and not of limitation and that many variations in the compounds given and the amounts indicated can be made without departing from the spirit of the invention and the scope of the appended claims.

EXAMPLE 1

*The preparation of dibutyl-tin di-thioglycolic acid amyl amide*

$(C_4H_9)_2Sn(SCH_2.CONH.C_5H_{11})_2$

One mol of thioglycolic acid, one mol of n-amylamine, and 100 cc. benzene, to which 0.3 gram p-toluene sulfonic acid was added, are refluxed and 18 cc. water eliminated by azeotropic distillation.

Subsequently, ½ mol of dibutyl tin oxide is added, refluxing being continued until the theoretical amount of water has distilled off. Slight impurities are filtered off and the benzene is distilled off. The residue is a very viscous liquid of a slightly yellowish color. It is soluble in ether, chloroform, carbontetrachloride, benzene, toluene, xylene, and other organic solvents.

Analysis:

|  | Sn | S | N |
|---|---|---|---|
| Calc. values | 21.4 | 11.6 | 5.1 |
| Found values | 21.0 | 11.4 | 5.2 |

EXAMPLE 2

*Preparation of dibutyl tin dithioglycolic acid diethylhexylamide*

$(C_4H_9)_2Sn(S.CH_2.CON(C_8H_{17})_2)_2$

The procedure is similar to the one described in Example 1, except that instead of one mol amylamine one mol of diethylhexylamine is reacted with the thioglycolic acid.

The final product is similar in appearance and properties to the mixture obtained according to Example 1.

Analysis:

|  | Sn | S | N |
|---|---|---|---|
| Calc. values | 13.7 | 7.45 | 3.25 |
| Found values | 13.5 | 7.3 | 3.1 |

EXAMPLE 3

*Preparation of dibutyl tin dithioglycolic acid morpholineamide*

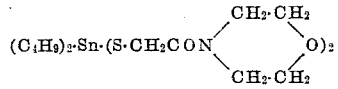

The procedure is similar to the one described in Example 1, except that instead of one mol amylamine, one mol morpholine is reacted with the acid.

The final product is similar in appearance and properties to the material obtained according to Example 1.

Analysis:

|  | Sn | S | N |
|---|---|---|---|
| Calc. values | 21.4 | 11.6 | 5.1 |
| Found values | 21.2 | 11.8 | 5.0 |

EXAMPLE 4

*Preparation of tributyl tin thiopropionic acid amylamide.*

$(C_4H_9)_3SnS.CH_2.CH_2CONH.C_5H_{11}$

One mol of β-thiopropionic acid, one mol of n-amylamine, and 100 cc. benzene, to which 0.3 g. p-toluene sulfonic acid were added, are refluxed until 18 cc. water are eliminated by azeotropic distillation.

To this solution, one mol of tributyl tin monochloride is added and refluxed for one hour. The reaction product is filtered and washed with water to eliminate the HCl formed in the reaction and the benzene stripped off the solution.

The residue is in appearance and properties similar to the material obtained according to Example 1.

Analysis:

|  | Sn | S | N |
|---|---|---|---|
| Values calc | 25.4 | 6.9 | 3.0 |
| Values found | 25.1 | 6.7 | 2.95 |

EXAMPLE 5

*Preparation of isopropyl tin tris γ-thiobutyric acid butyl amide*

$C_3H_7Sn.(S.CH_2.CH_2.CH_2CONHC_4H_9)_3$

One mol thiobutyric acid, one mol n-butylamine, and 100 cc. benzene, to which 0.3 g. p-toluene sulfonic acid were added, are reacted until the theoretical amount of water has been eliminated by azeotropic distillation.

To this solution, one-third of a mol isopropylstannonic acid, prepared as described in the literature, is added and refluxed until 9 cc. water are driven off. The reaction product is filtered off and benzene is driven off.

The residue is in appearance and properties similar to the material obtained according to Example 1.

Analysis:

|  | Sn | S | N |
|---|---|---|---|
| Values calc | 17.3 | 14.0 | 6.15 |
| Values found | 17.0 | 13.8 | 6.0 |

The novel compounds made according to the method described above may be used for various purposes. They are excellent stabilizers for chlorinated resins or other high molecular weight halogenated material, and may be used as antioxidants. They may also be interesting as such, or as intermediates for pharmaceuticals and cosmetics.

In case the compounds are used as stabilizers, the amount by weight of the same will be from 0.1 to 10%.

In the following, an example will be given for the manufacture of a plastic film, in which the compound according to the present invention is used as a stabilizer.

EXAMPLE 6

100 parts of vinylite VYNW (vinyl chloride and acetate copolymer in the ratio 95:5), 50 parts of dioctylphthalate, and two parts of the product made according to Example 2 as stabilizer, are mixed by tumbling for a period of one hour. The whole mass is then transferred to a Banbury mixer and fused for 10 min. at a temperature of approximately 300° F. It is then dropped and transferred to a warmup mill, whose roll temperature is likewise maintained at 300° F. The material is then fed as needed to a 3 or 4 roll calender. The roll temperatures of the calender range from 280°–350° F. The vinyl compound is calendered into a film at .004 inch or any other desirable gage.

EXAMPLE 7

A comparison test was made in which chlorinated paraffin was heated over a period of time, without any addition on the one hand, and with addition of a stabilizer made according to the invention on the other hand.

In this test, a nitrogen current was passed through chlorinated paraffin containing 40% chlorine, at a temperature of 150° F. for 12 hours. During the test, the paraffin lost 10% chlorine.

The same chlorinated paraffin, to which 3% of the product obtained in Example 3 were added, was treated in a similar manner and showed a loss of only 1% chlorine after 12 hours.

EXAMPLE 8

The following procedure is used to advantage in making a finished solution of the resin. We use 100 parts of vinylite VYNW (vinyl chloride and acetate copolymer in the ratio 95:5). This is weighed into a dry blender and 40 parts of tricresyl phosphate and 1 part of stabilizer (made as described in Example 1) are then added. The whole mass is agitated by tumbling for 30 minutes and then transferred to a 2-roll mill whose roll temperatures are at about 240° F. The mass is fluidized on the mill and then sheeted into strips which are added to a mixture consisting of 3 parts of methyl ethyl ketone and 1 part of toluene in a conventional mixer. The compound is agitated at room temperature in the mixer until complete solution results. The proportion of solvent used will vary with the concentration of solution desired, as, for instance, from 500 to 3,000 parts of solvent to 100 parts of the vinyl chloride resin used.

We claim:
1. As a new compound, a product having the formula

$$R_n\text{—}Sn\text{—}X_{4-n}$$

wherein R represents alkyl, X represents the radical of an amide of a saturated aliphatic mercapto acid having from 2–6 carbon atoms with an amine selected from the group consisting of primary and secondary alkylamines and morpholine, and $n$ represents an integer from 1–3, and wherein the sulfur of the amide radical is attached to the tin.

2. A compound according to claim 1, wherein said saturated aliphatic mercapto acid is thioglycolic acid.

3. A compound according to claim 1, wherein said saturated aliphatic mercapto acid is thiopropionic acid.

4. A compound according to claim 1, wherein said saturated aliphatic mercapto acid is thiobutyric acid.

5. A compound according to claim 1, wherein said saturated aliphatic mercapto acid is thiovalerianic acid.

6. A compound according to claim 1, wherein said saturated aliphatic mercapto acid is thiocaproic acid.

7. As a new compound, dibutyl tin dithioglycolic acid amylamide.

8. As a new compound, dibutyl tin thioglycolic acid diethylhexylamide.

9. As a new compound, dibutyl tin dithioglycolic acid morpholineamide.

10. As a new compound, tributyl tin thiopropionic acid amylamide.

11. As a new compound, isopropyl tin tris-γ-thiobutyric acid butylamide.

12. The process for preparing a compound having the formula $$R_n\text{—}Sn\text{—}X_{4-n}$$

wherein R represents alkyl, X represents the radical of an amide of a saturated aliphatic mercapto acid having from 2–6 carbon atoms with an amine selected from the group consisting of primary and secondary alkylamines and morpholine, and $n$ represents an integer from 1–3 and wherein the sulfur of the amide radical is attached to tin, which comprises first preparing the corresponding amide of said mercapto acid, and then reacting said amide at elevated temperature with a member selected from the group consisting of an alkyl tin halide, an alkyl tin oxide, and an alkyl tin stannonic acid.

13. A resinous composition selected from the group consisting of polyvinyl chloride and copolymers thereof containing a preponderant amount of polyvinyl chloride and stabilized with 0.1% to 10% by weight of the compound of claim 1.

References Cited in the file of this patent

UNITED STATES PATENTS

| 1,917,073 | Stewart et al. | July 4, 1933 |
| 2,043,257 | Missbach | June 9, 1936 |
| 2,580,730 | Church et al. | Jan. 1, 1952 |
| 2,591,675 | Church et al. | Apr. 8, 1952 |
| 2,593,267 | Church et al. | Apr. 15, 1952 |